US008899605B2

(12) United States Patent
Kim

(10) Patent No.: US 8,899,605 B2
(45) Date of Patent: Dec. 2, 2014

(54) PEDAL-DRIVEN ROLLER BOARD

(76) Inventor: Ji Hoon Kim, Daejeon (KR)

( * ) Notice: Subject to any disclaimer, the term of this patent is extended or adjusted under 35 U.S.C. 154(b) by 42 days.

(21) Appl. No.: 13/639,191

(22) PCT Filed: Jul. 28, 2011

(86) PCT No.: PCT/KR2011/005546
§ 371 (c)(1),
(2), (4) Date: Dec. 11, 2012

(87) PCT Pub. No.: WO2012/023712
PCT Pub. Date: Feb. 23, 2012

(65) Prior Publication Data
US 2013/0200590 A1    Aug. 8, 2013

(30) Foreign Application Priority Data

Aug. 20, 2010  (KR) .................. 10-2010-0080889

(51) Int. Cl.
| B62M 1/02 | (2006.01) |
| B62M 1/30 | (2013.01) |
| B62K 3/00 | (2006.01) |
| B62K 5/02 | (2013.01) |
| B62M 1/26 | (2013.01) |

(52) U.S. Cl.
CPC .................. B62M 1/30 (2013.01); B62K 3/002 (2013.01); B62K 5/02 (2013.01); B62M 1/26 (2013.01)
USPC .............................. 280/257; 280/221; 280/253

(58) Field of Classification Search
USPC ................. 280/221, 252, 253, 256, 257, 258
See application file for complete search history.

(56) References Cited

U.S. PATENT DOCUMENTS 310,676  A  *  1/1885  Hall ................................ 280/221
833,314  A  *  10/1906  Fothergill ..................... 280/257

(Continued)

FOREIGN PATENT DOCUMENTS

DE   202009006517 U1   1/2010
JP       2007-159776 A    6/2007

(Continued)

*Primary Examiner* — Kevin Hurley
*Assistant Examiner* — Michael Stabley
(74) *Attorney, Agent, or Firm* — AKC Patents, LLC; Aliki K. Collins

(57) ABSTRACT

The present invention relates to a roller board, and more particularly, to a pedal-driven roller board that converts a reciprocating motion of pedals formed on the board into a rotational motion to drive a gear, so that a user can drive the board without kicking the ground. Furthermore, the pedal-driven roller board includes a derailleur, so that a user can conveniently control the speed of the pedal-driven roller board. Moreover, a user can develop and strengthen his/her muscles by pedaling the pedal-driven roller board. To this end, a pedal-driven roller board according to the present invention includes: a handle disposed at the front side of a board to steer a front wheel; a rear wheel at the rear side of the board; and two pedals formed on the top surface of the board to drive the rear wheel. Further, the pedal-driven roller board includes: a link having an end hinged to the bottom surface of a pedal; a driving gear formed on an end of a crankshaft connected through a shaft to the other end of the link to convert a reciprocating motion of the pedal into a rotational motion; a clutch gear engaged with the driving gear to rotate, and selectively connected to one of either a first speed gear or a second speed gear to rotate same; a first connecting gear and a second connecting gear, which rotatably engage with the first speed gear and the second speed gear, respectively, and are installed on an end of a connecting shaft; a transmission gear installed on both ends of the connecting shaft and rotated by torque transmitted through the connecting shaft from the first and second connecting gears; and a rotation gear engaging with the transmission gear to rotate, and connected to the rear wheel through a rotation shaft to transmit the torque from the transmission gear to the rear wheel.

1 Claim, 6 Drawing Sheets

(56) References Cited

U.S. PATENT DOCUMENTS

| | | | | |
|---|---|---|---|---|
| 1,571,562 | A * | 2/1926 | Tingley | 280/257 |
| 1,690,342 | A * | 11/1928 | Madsen | 280/257 |
| 6,173,981 | B1 * | 1/2001 | Coleman | 280/253 |
| 6,764,088 | B2 * | 7/2004 | Hung | 280/221 |
| 7,487,987 | B2 * | 2/2009 | Yan | 280/221 |
| 7,621,547 | B1 * | 11/2009 | Fan | 280/221 |
| 2002/0093171 | A1 | 7/2002 | Chen | |
| 2004/0018919 | A1 | 1/2004 | Chen | |

FOREIGN PATENT DOCUMENTS

| | | |
|---|---|---|
| KR | 10-2002-0027850 A | 4/2002 |
| KR | 10-0763397 B1 | 9/2007 |
| KR | 10-0832558 B1 | 5/2008 |
| WO | 2009035278 A2 | 3/2009 |

* cited by examiner

PEDAL-DRIVEN ROLLER BOARD

TECHNICAL FIELD

The present invention relates to a roller board, and in particular to a pedal-driven roller board which is configured to enable a roller board to move in such a way that the gears can be driven as the reciprocation movements of the pedal disposed at a board are converted to a rotational movement unless a user kicks the ground, and a user can easily change the speed with the aid of a transmission and can do a muscle exercise as the user steps on the pedals.

BACKGROUND ART

Generally speaking, a roller board is configured for a user to ride on a board with wheels at the front and rear sides, respectively, and to move forward while kicking the ground with one foot.

The above mentioned roller board is widely used because it is portable and is easy to store and anyone can easily use it.

However, since the conventional roller board is driven with one foot kicking the ground, a kid or a child whose physical frame is not fully grown might suffer from the deformed physical growths, and when a user uses it for a long time, a lot of physical energy is consumed. In particular, when it is used on a slope, more energy is needed, so there are lots problems to use it for a long time and to enjoy with it.

DISCLOSURE OF INVENTION

Accordingly, the present invention is made to improve the above mentioned problems. It is an object of the present invention to provide a pedal-driven roller board which is configured to enable a roller board to move in such a way that the gears can be driven as the reciprocation movements of the pedal disposed at a board are converted to a rotational movement unless a user kicks the ground, and a user can easily change the speed with the aid of a transmission and can do a muscle exercise as the user steps on the pedals.

To achieve the above objects, there is provided a pedal-driven roller board in a rolling board characterized in that a handle steering front wheels is disposed at a front side of a board, and rear wheels are axially engaged to a rear side of it by means of a rotary gear and a rotary shaft, and two pedals are formed on the upper surface of the board for the purpose of driving the rear wheels, and a link one end of which is hinged is installed on the lower surface of the pedal, and a crank shaft is installed at the other end of the link in an axial engagement way for converting the reciprocation movements of the pedals into rotational movements, and a driving gear is integrally engaged at an end portion of the crank shaft, so the rotational force of the crank shaft is transferred to the rotary gear by way of the driving gear, thus driving the rear wheels, and a saddle is provided on the upper surface of a rear side of the board, comprising:

a clutch gear which rotates in engagement with a driving gear between a driving gear and a rotary gear for the purpose of driving the rear wheels as the rotational force of the crank shaft is transferred to the rotary gear by way of the driving gear and which is selectively connected with one speed change gear between a first speed change gear and a second speed change gear;

first and second connection gears which rotate in engagement with the first speed change gear and the second speed change gear and are installed at an end portion of the connection shaft; and a driving force transfer gear which is installed at both ends of the connection shaft and receives the rotational force of the first and second connection gears by way of the connection shaft while being engaged with the rotary gear for thereby rotating the rotary gear, and wherein the first speed change gear and the second speed change gear are installed on the same axis as the clutch gear, and clutch cams are installed on the surface corresponding to the clutch gear of the first speed change gear and the second speed change gear and at both sides of the clutch gear, so the speed change gear connected with the clutch gear rotates, and a speed change lever is further provided at an end portion of the clutch gear for the purpose of connecting the clutch gear with one between the first speed change gear and the second speed change gear.

The objects and effects of the present invention will become clear by way of the following detailed descriptions of the invention and the descriptions according to the preferred embodiments of the present invention and the disclosed embodiments do not limit the scope of the invention.

ADVANTAGEOUS EFFECTS

According to a pedal-driven roller board according to the present invention, it is configured to enable a roller board to move in such a way that the gears can be driven as the reciprocation movements of the pedal disposed at a board are converted to a rotational movement unless a user kicks the ground, and a user can easily change the speed with the aid of a transmission and can do a muscle exercise as the user steps on the pedals.

MODES FOR CARRYING OUT THE INVENTION

Figure 1:
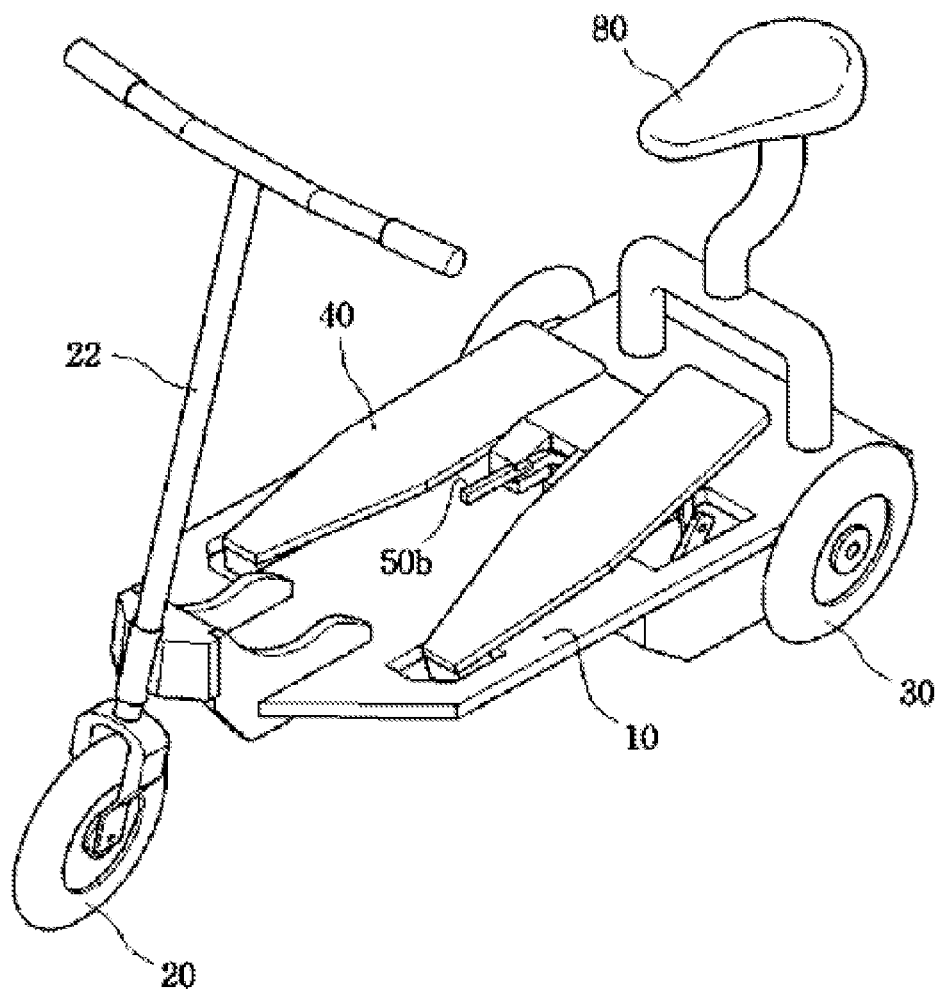
FIG. 1 is a perspective view illustrating a pedal-driven roller board according to the present invention.

Hereinafter the preferred embodiments of the present invention will be described with reference to the accompanying drawings. The elements having the same functions and construction will be given the same reference numerals.

Figure 2:
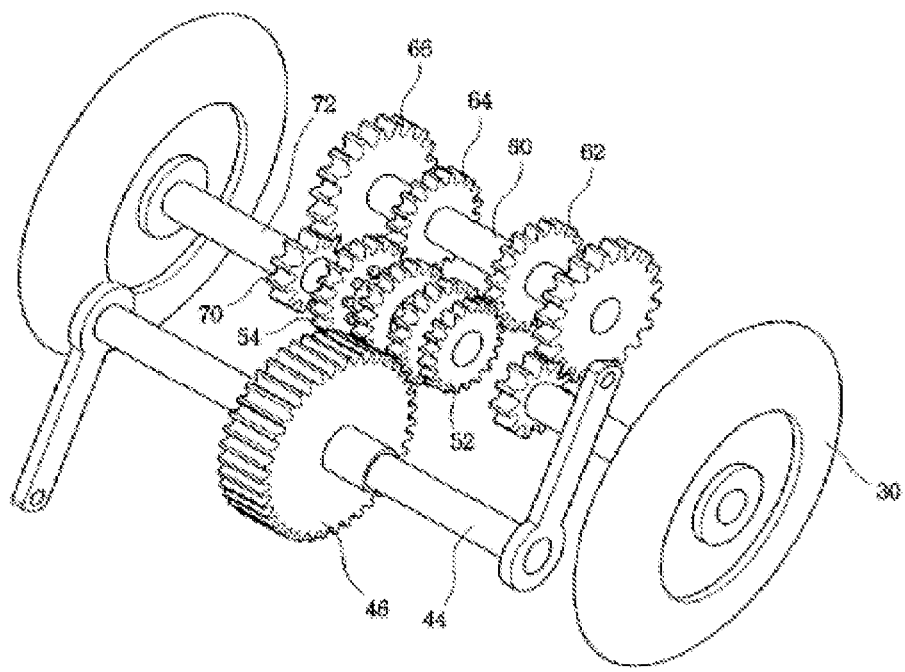
FIG. 2 is a perspective view illustrating a driving force transfer device for a penal-driven roller board according to the present invention.
Figure 3:
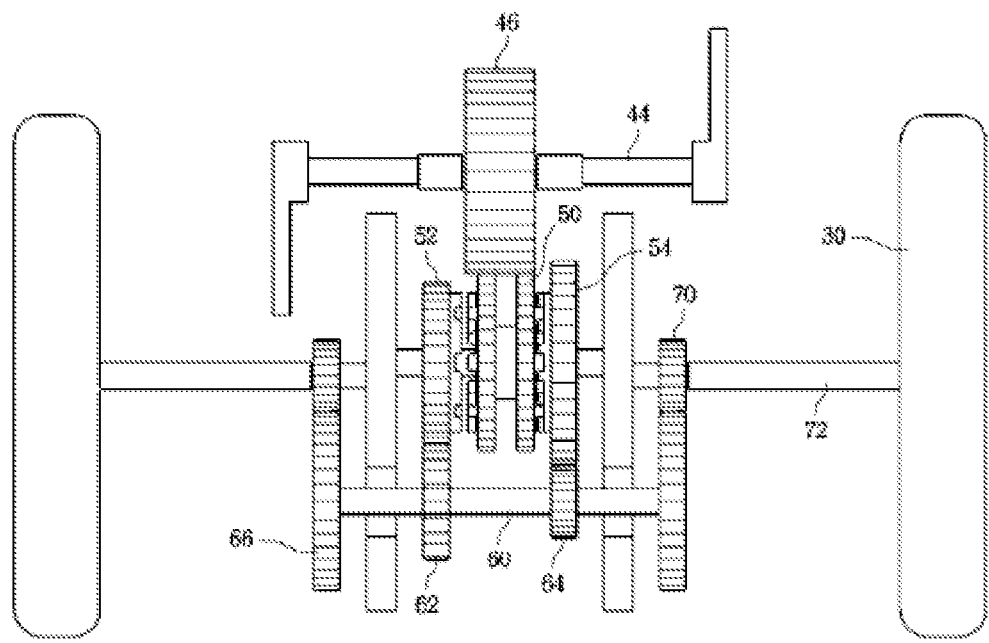
FIG. 3 is a plane view illustrating a driving force transfer device for a pedal-driven roller board according to the present invention.
Figure 4:
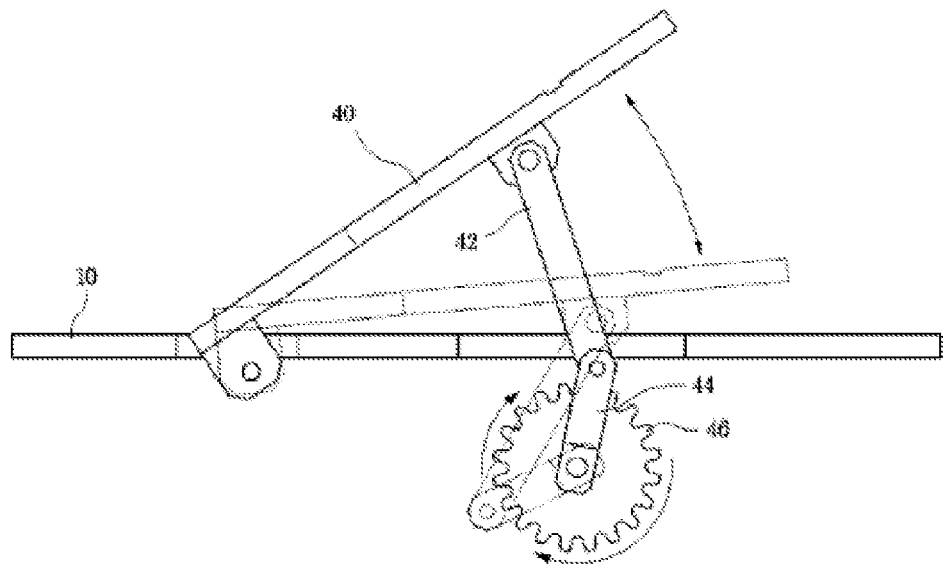
FIG. 4 is a view illustrating a state that a driving gear rotates by means of a pedal according to the present invention.
Figure 5A:
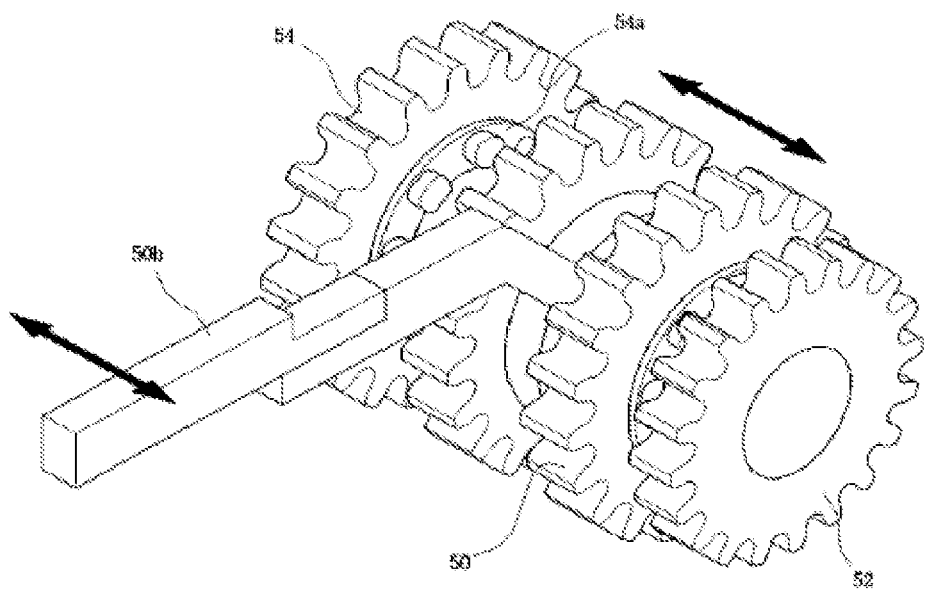
FIGS. 5a and 5d are views illustrating a clutch gear and a speed change gear according to the present invention.
Figure 5B:
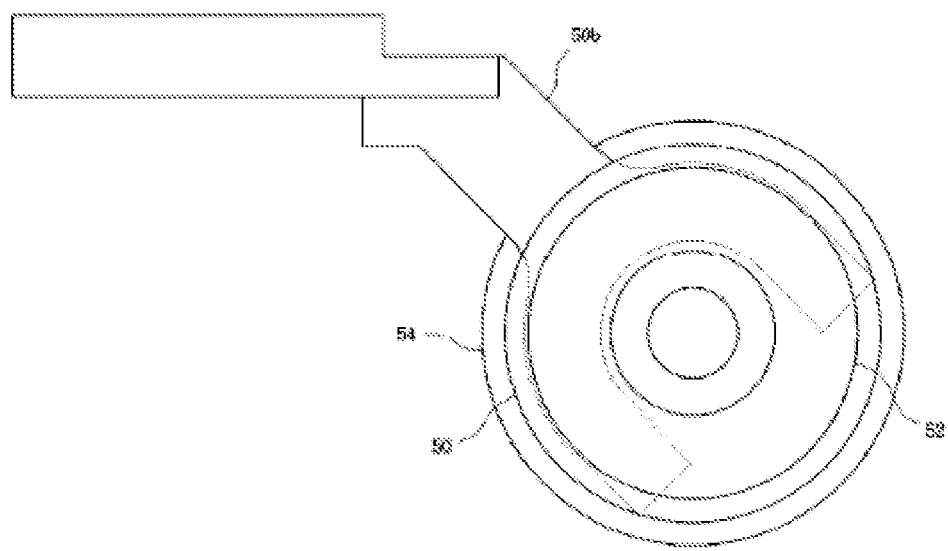
Figure 5C:
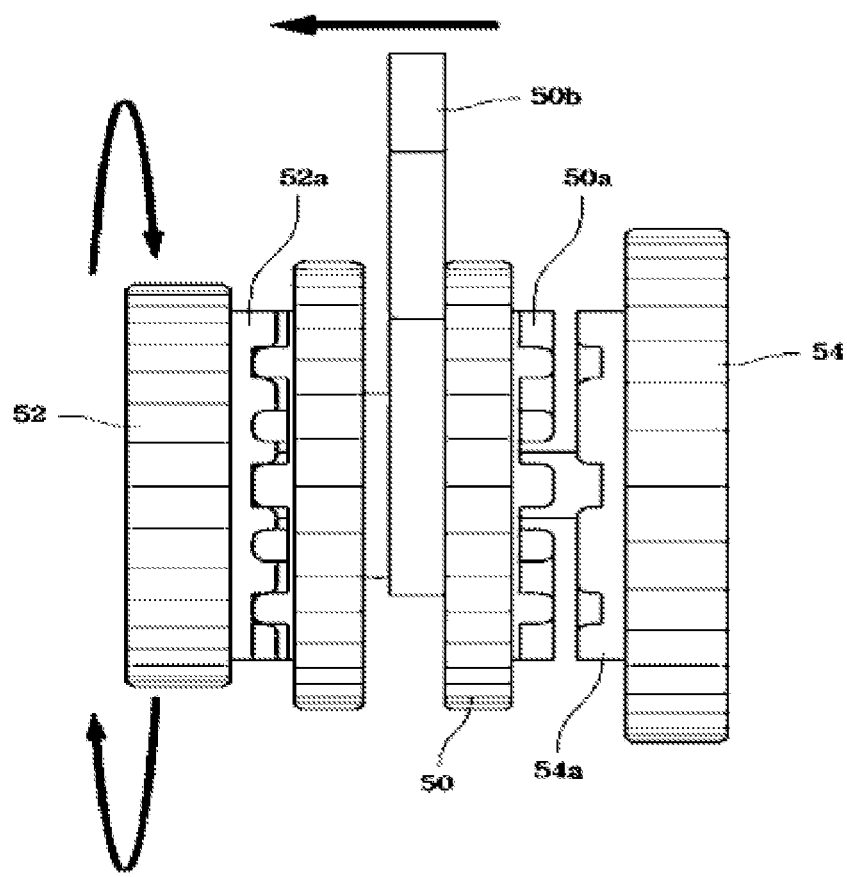
Figure 5D:
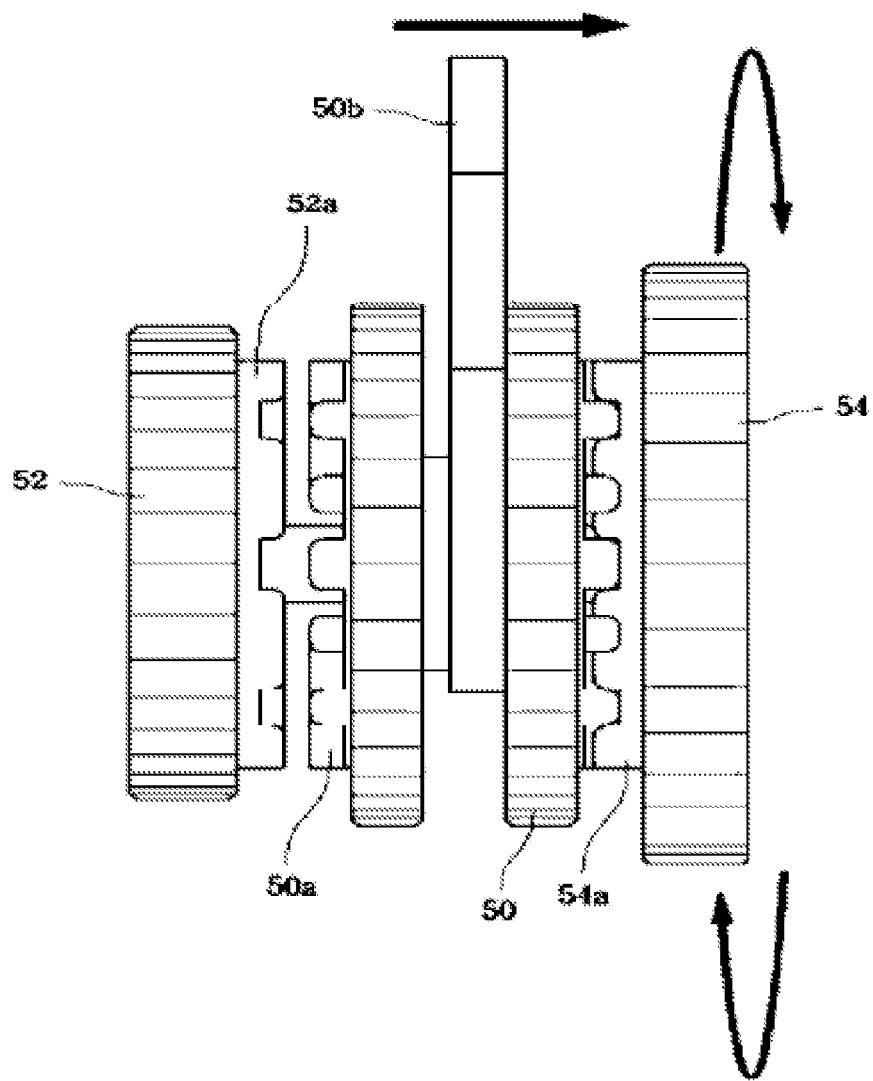

FIG. 1 is a perspective view illustrating a pedal-driven roller board according to the present invention. FIG. 2 is a perspective view illustrating a driving force transfer device for a penal-driven roller board according to the present invention. FIG. 3 is a plane view illustrating a driving force transfer device for a pedal-driven roller board according to the present invention. FIG. 4 is a view illustrating a state that a driving gear rotates by means of a pedal according to the present invention. FIGS. 5a and 5d are views illustrating a clutch gear and a speed change gear according to the present invention.

First of all, the term "front side" in the present invention represents a direction that the roller board moves forward and "rear side" represents the opposite direction of the front side.

Referring to FIGS. 1 to 5d, the pedal-driven roller board according to the present invention is characterized in that a handle 22 is provided at a front side of a board 10 for the purpose of steering the front wheels 20, the rear wheels 30 being disposed at the rear side. Two pedals 40 are provided on the upper surface of the board 10 for the purpose of driving the rear wheels 30.

There is provided a link 42 one end of which is hinged at underneath the pedal 40, and the other end of which is axially connected with a crank shaft 44 for thereby connecting the pedal 40 and the crank shaft 44 configured to convert the reciprocation movements of the pedal 40, which moves upward and downward, into the rotational movements.

In addition, a driving gear 46 is disposed at an end portion of the crank shaft 44.

The driving gear 46 rotating by means of the crank shaft 44 is engaged with the clutch gear 50, thus rotating the clutch gear 50.

At both sides of the clutch gear 50 are provided a first speed change gear 52 and a second speed change gear 54 which are installed on the same axis as the clutch gear 50 and are selectively engaged with the clutch gear 50.

On the surface corresponding to the clutch gear 50 and at both sides of the first speed change gear 52 and the second speed change gear 54 are provided clutch cams 50a, 52a and 54a, so a speed change gear connected with the clutch gear 50 between the first speed change gear 52 and the second speed change gear 54 can rotate.

A speed change lever 50b is provided at one end of the clutch gear 50 so as to be selectively connected with a speed change gear between the first speed change gear 52 and the second speed change gear 54 installed at both sides of the clutch gear 50.

Preferably, the speed change lever 50b is protruded passing through the upper surface of the board 10 so that a user can easily move the clutch gear 50.

A first connection gear 62 and a second connection gear 64 are installed at the first speed change gear 52 and the second speed change gear 54 which rotate in connection with the clutch gear 50.

The first connection gear 62 and the second connection gear 64 are installed at the end portion of the connection shaft 60, so the connection shaft 60 can rotate whichever speed change gear is connected with the clutch gear 50.

At both ends of the connection shaft 60 are disposed the driving force transfer gear 66, and a rotary gear 70 is engaged with each driving force transfer gear 66.

The rotary gear 70 is configured to receive a rotational force from the driving force transfer gear 66 and rotates and is connected with the rear wheels 30 by way of the rotary shaft 72 so that the rotational force can be transferred to the rear wheels 30 for thereby driving the rear wheels 30.

In other words, when a user pedals upward and downward the pedals 40, the upward and downward reciprocation movements are converted into the rotational movements by means of the crank shaft 44 connected with the pedals 40, and the converted rotational movements are transferred to the rear wheels 30 by way of the first and second speed change gears 52 and 54 connected with the clutch gear 50 through the driving gear 46, the first and second connection gears 62 and 64, the driving force transfer gear 66 and the rotary gear 70, so the roller board can move forward.

At this moment, a separate motor (not shown) can be further installed as an auxiliary driving force means at the rotary shaft 72 where the rear wheels 30 are installed or the connection shaft 60.

In addition, according to another embodiment of the pedal-driven roller board of the present invention, a saddle 80 is further installed at the upper surface of the rear side of the board 10, so a user can sit on it like a bicycle.

The pedal-driven roller board according to the present invention is characterized in that a chair or an infant seat can be further installed on the upper surface of the board 10 in order for a disabled person to sit on it, so it can be used as a stroller or a driven chair. A bucket can be installed for transporting a baggage like a cart. An outer structure looking like a vehicle can be further installed, so it can be used as a cart or a kid's toy vehicle.

In other words, as it is well understood with the above descriptions, the pedal-driven roller board according to the present invention is characterized in that the board 10 can move forward in such a way to drive the gears while converting the reciprocation movements of the pedals 40 disposed at the board 10 into the rotational movements unless a user kicks the ground, and a user can easily adjust the speed with the aid of the speed change device, and the muscles of the user can be trained as the user steps on the pedals 40.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

<Descriptions of the reference numerals>

| | |
|---|---|
| 10: board | 20: front wheels |
| 22: handle | 30: rear wheels |
| 40: pedals | 42: link |
| 44: crank shaft | 46: driving gear |
| 50: clutch gears | 50a, 52a, 54a: clutch cam |
| 50b: speed change lever | 52: first speed change gear |
| 54: second speed change gear | 60: connection shaft |
| 62: first connection gear | 64: second connection gear |
| 66: driving force transfer gear | 70: rotary gear |
| 72: rotary shaft | 80: saddle |

The invention claimed is:

1. A pedal-driven rolling board in a rolling board characterized in that a handle 22 steering front wheels 20 is disposed at a front side of a board 10, and rear wheels 30 are axially engaged to a rear side of it by means of a rotary gear 70 and a rotary shaft 72, and two pedals 40 are formed on the upper surface of the board 10 for the purpose of driving the rear wheels 30, and a link 42 one end of which is hinged is installed on the lower surface of the pedal 40, and a crank shaft 44 is installed at the other end of the link 42 in an axial engagement way for converting the reciprocation movements of the pedals 40 into rotational movements, and a driving gear 46 is integrally engaged at an end portion of the crank shaft 44, so the rotational force of the crank shaft 44 is transferred to the rotary gear 70 by way of the driving gear 46, thus driving the rear wheels 30, and a saddle 80 is provided on the upper surface of a rear side of the board 10, comprising:

a clutch gear 50 which rotates in engagement with a driving gear 46 between a driving gear 46 and a rotary gear 70 for the purpose of driving the rear wheels 30 as the rotational force of the crank shaft 44 is transferred to the rotary gear 70 by way of the driving gear 46 and which is selectively connected with one speed change gear between a first speed change gear 52 and a second speed change gear 54;

first and second connection gears 62 and 64 which rotate in engagement with the first speed change gear 52 and the second speed change gear 54 and are installed at an end portion of the connection shaft 60; and a driving force transfer gear 66 which is installed at both ends of the connection shaft 60 and receives the rotational force of the first and second connection gears 62 and 64 by way of the connection shaft 60 while being engaged with the rotary gear 70 for thereby rotating the rotary gear 70, and wherein the first speed change gear 52 and the second speed change gear 54 are installed on the same axis as the clutch gear 50, and clutch cams 50a, 52a and 54a are installed on the surface corresponding to the clutch gear 50 of the first speed change gear 52 and the second speed change gear 54 and at both sides of the clutch gear 50, so the speed change gear connected with the clutch gear 50 rotates, and a speed change lever 50b is further provided at an end portion of the clutch gear 50 for the purpose of connecting the clutch gear 50 with one between the first speed change gear 52 and the second speed change gear 54.

* * * * *